(12) United States Patent
Chen et al.

(10) Patent No.: US 9,072,087 B2
(45) Date of Patent: Jun. 30, 2015

(54) CHANNEL STATE INFORMATION DEPENDENT ACK/NAK BUNDLING

(71) Applicant: QUALCOMM Incorporated, San Diego, CA (US)

(72) Inventors: Wanshi Chen, San Diego, CA (US); Jelena Damnjanovic, Del Mar, CA (US); Peter Gaal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 13 days.

(21) Appl. No.: 13/794,624

(22) Filed: Mar. 11, 2013

(65) Prior Publication Data

US 2013/0258960 A1 Oct. 3, 2013

Related U.S. Application Data

(60) Provisional application No. 61/616,951, filed on Mar. 28, 2012, provisional application No. 61/618,577, filed on Mar. 30, 2012.

(51) Int. Cl.
*H04W 72/04* (2009.01)
*H04L 1/00* (2006.01)
*H04L 1/16* (2006.01)
(Continued)

(52) U.S. Cl.
CPC .......... *H04W 72/0406* (2013.01); *H04L 1/0026* (2013.01); *H04L 1/1671* (2013.01); *H04L 1/0031* (2013.01); *H04L 1/1635* (2013.01); *H04L 1/1861* (2013.01); *H04L 5/001* (2013.01); *H04L 5/0057* (2013.01);
(Continued)

(58) Field of Classification Search
CPC ......... H04L 47/10; H04L 47/30; H04L 47/11; H04L 47/12; H04L 47/15; H04L 47/2441; H04L 47/70; H04L 47/22; H04L 47/27; H04L 2012/5635
USPC .......... 370/229–235, 329, 330, 335, 336, 337
See application file for complete search history.

(56) References Cited

U.S. PATENT DOCUMENTS

2011/0249578 A1 10/2011 Nayeb Nazar et al.
2012/0033587 A1 2/2012 Papasakellariou et al.
(Continued)

FOREIGN PATENT DOCUMENTS

WO 2012036478 A2 3/2012
WO 2012121546 A2 9/2012

OTHER PUBLICATIONS

International Search Report and Written Opinion—PCT/US2013/030614—ISA/EPO—Jun. 27, 2013.
(Continued)

*Primary Examiner* — Dady Chery
(74) *Attorney, Agent, or Firm* — Seyfarth Shaw LLP

(57) ABSTRACT

A method of wireless communication includes determining a capacity of a control channel based on whether multiplexing of acknowledgement/negative acknowledgement (ACK/NAK) bits for multiple component carriers with periodic channel state information (CSI) is allowed. A threshold for a number of ACK/NAK bits is determined based at least in part on a payload size of the periodic CSI and the determined capacity. The method also includes bundling ACK/NAK bits when a number of the ACK/NAK bits is greater than the determined threshold. The ACK/NAK bits and the periodic CSI are transmitted via the control channel.

25 Claims, 12 Drawing Sheets

(51) Int. Cl.
  H04L 1/18   (2006.01)
  H04L 5/00   (2006.01)
  H04L 25/03  (2006.01)

(52) U.S. Cl.
  CPC ........ *H04L 25/03898* (2013.01); *H04L 5/0055* (2013.01); *H04L 1/0021* (2013.01)

(56) References Cited

U.S. PATENT DOCUMENTS

2012/0087254 A1   4/2012   Yin et al.
2012/0243497 A1   9/2012   Chung et al.
2013/0182627 A1*  7/2013   Lee et al. ............... 370/311

OTHER PUBLICATIONS

Nokia Siemens Networks et al., "Multiplexing CSI and carrier aggregation ACK/NACK on PUCCH," 3GPP Draft; R1-111015, 20110215 3rd Generation Partnership Project (3GPP), Mobile Competence Centre ; 650, route des Lucioles ; F-06921 Sophia-Antipolis Cedex ; France, vol. Ran WG1,Nr:Taipei, Taiwan; 20110221, XP050490709.

ZTE: "Multiplexing of periodic CSI and ACKNACK on PUCCH," 3GPP Draft; R1-110164 20110111 3rd Generation Partnership Project (3GPP), Mobile Competence Centre ; 650, route des Lucioles ; F-06921 Sophia-Antipolis Cedex ; France, vol. Ran WG1,Nr: Dublin, Ireland; 20110117, XP050490101.

* cited by examiner

CHANNEL STATE INFORMATION DEPENDENT ACK/NAK BUNDLING

CROSS-REFERENCE TO RELATED APPLICATION

This application claims the benefit under 35 U.S.C. §119(e) to U.S. Provisional Patent Application No. 61/616,951 entitled "CHANNEL STATE INFORMATION DEPENDENT ACKNAK BUNDLING IN LTE," filed on Mar. 28, 2012, and U.S. Provisional Patent Application No. 61/618,577 entitled "CHANNEL STATE INFORMATION DEPENDENT ACK/NAK BUNDLING IN LTE," filed on Mar. 30, 2012, the disclosures of which are expressly incorporated by reference herein in their entireties.

BACKGROUND

1. Field

Aspects of the present disclosure relate generally to wireless communication systems, and more particularly to ACK/NAK bundling in wireless communications.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

In one aspect of the present disclosure, a method of wireless communication is disclosed. The method includes determining a capacity of a control channel based at least in part on whether multiplexing of acknowledgement/negative acknowledgement (ACK/NAK) bits for a set of component carriers with periodic channel state information (CSI) is allowed. The method also includes determining a threshold for a number of ACK/NAK bits based at least in part on a payload size of the periodic CSI and the determined capacity. The method further includes bundling ACK/NAK bits when a number of the ACK/NAK bits is greater than the determined threshold. The method still further includes transmitting the ACK/NAK bits and the periodic CSI using the control channel.

Another aspect of the present disclosure discloses an apparatus including means for determining a capacity of a control channel based at least in part on whether multiplexing of ACK/NAK bits for multiple component carriers with periodic CSI is allowed. The apparatus also includes means for determining a threshold for a number of ACK/NAK bits based at least in part on a payload size of the periodic CSI and the determined capacity. The apparatus further includes means for bundling ACK/NAK bits when a number of the ACK/NAK bits is greater than the determined threshold. The apparatus still further includes means for transmitting the ACK/NAK bits and the periodic CSI using the control channel.

In another aspect, a computer program product for wireless communications in a wireless network having a non-transitory computer-readable medium is disclosed. The computer readable medium has non-transitory program code recorded thereon. When executed by the processor(s), the code causes the processor(s) to perform operations of determining a capacity of a control channel based at least in part on whether multiplexing of ACK/NAK bits for multiple component carriers with periodic CSI is allowed. The program code also causes the processor(s) to determine a threshold for a number of ACK/NAK bits based at least in part on a payload size of the periodic CSI and the determined capacity. The program code further causes the processor(s) to bundle ACK/NAK bits when a number of the ACK/NAK bits is greater than the determined threshold. The program code still further causes the processor(s) to transmit the ACK/NAK bits and the periodic CSI using the control channel.

Another aspect discloses wireless communication having a memory and at least one processor coupled to the memory. The processor(s) is configured to determine a capacity of a control channel based at least in part on whether multiplexing of ACK/NAK bits for multiple component carriers with periodic CSI is allowed. The processor(s) is also configured to determine a threshold for a number of ACK/NAK bits based at least in part on a payload size of the periodic CSI and the determined capacity. The processor(s) is further configured to bundle ACK/NAK bits when a number of the ACK/NAK bits is greater than the determined threshold. The processor(s) is still further configured to transmit the ACK/NAK bits and the periodic CSI using the control channel.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
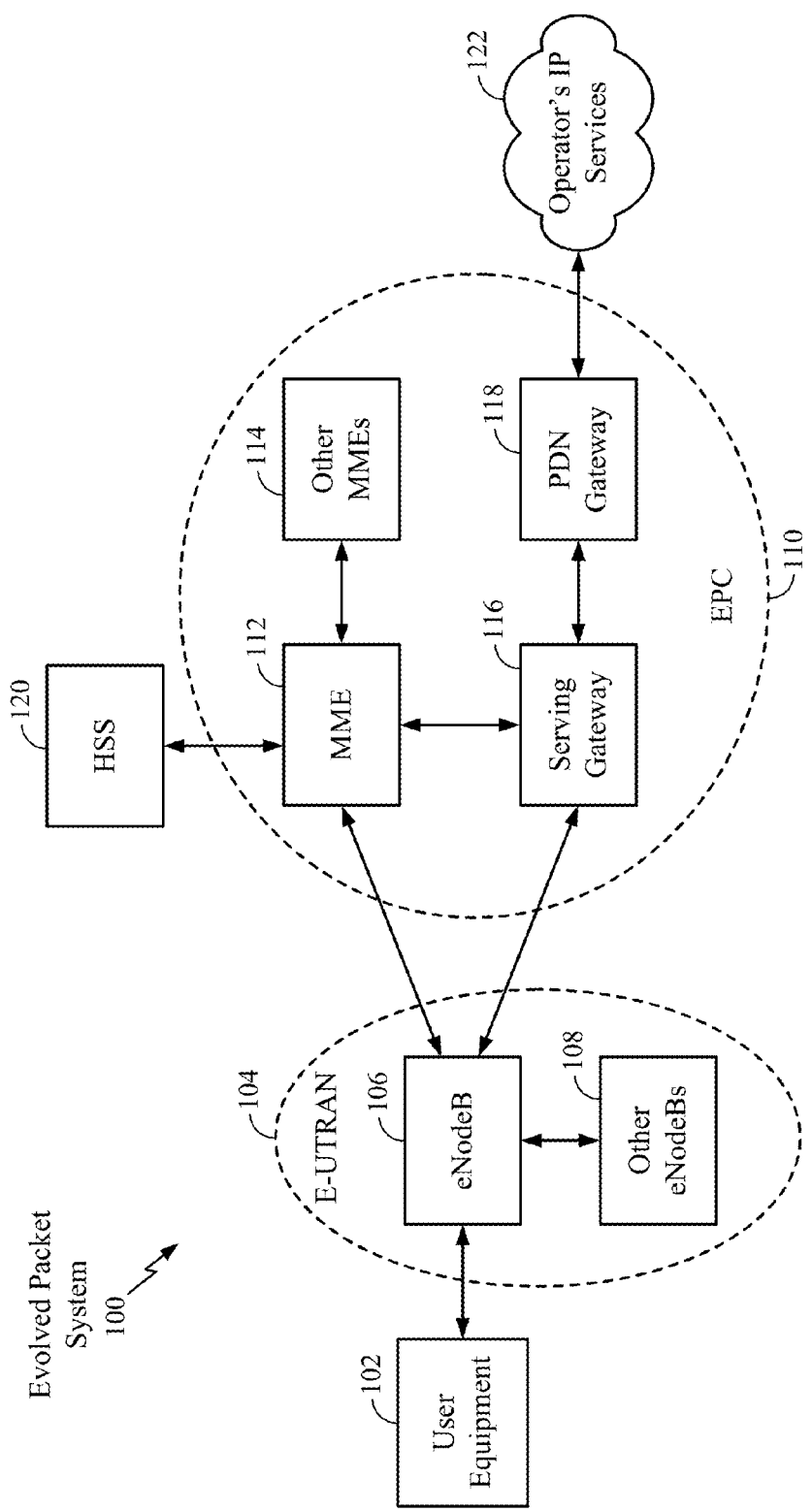
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
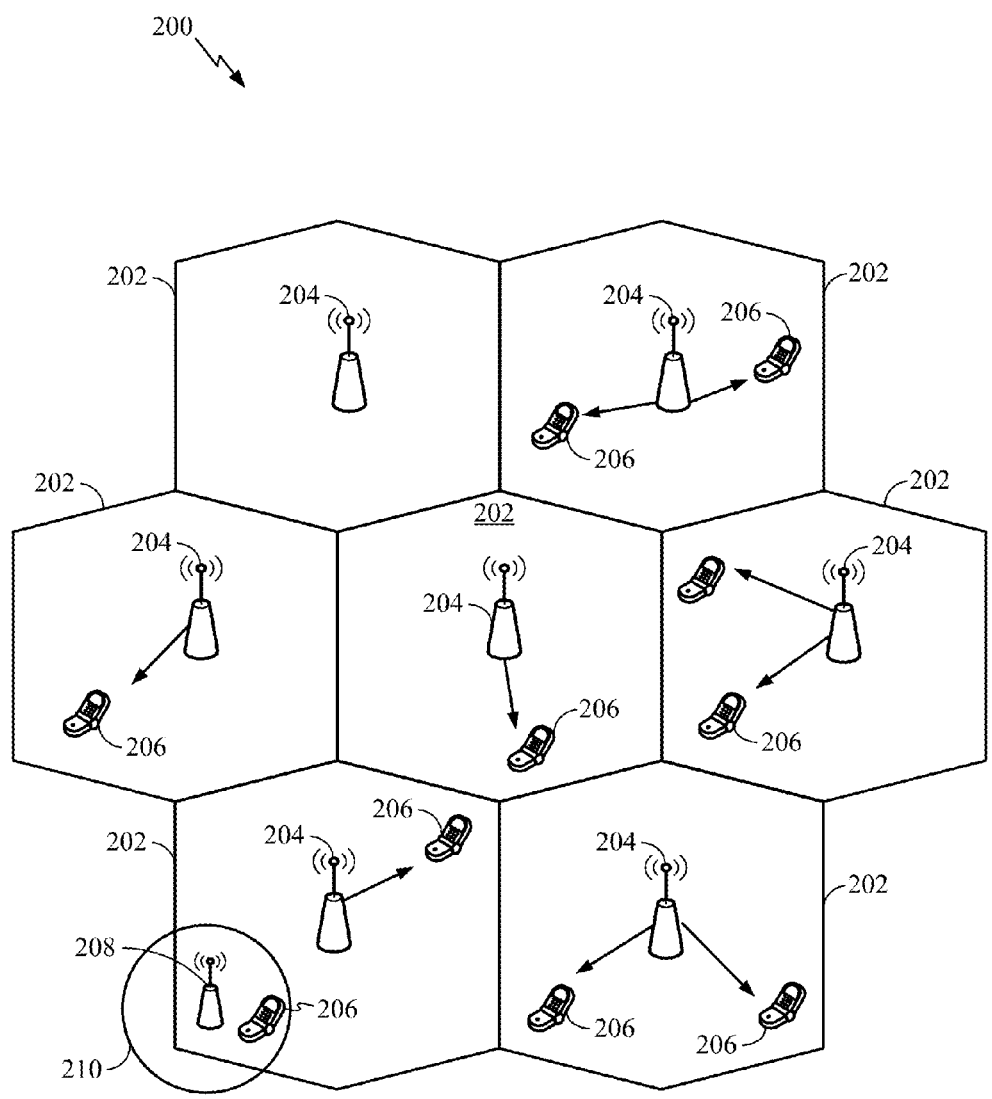
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be a remote radio head (RRH), a femto cell (e.g., home eNodeB (HeNB)), a pico cell, or a micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
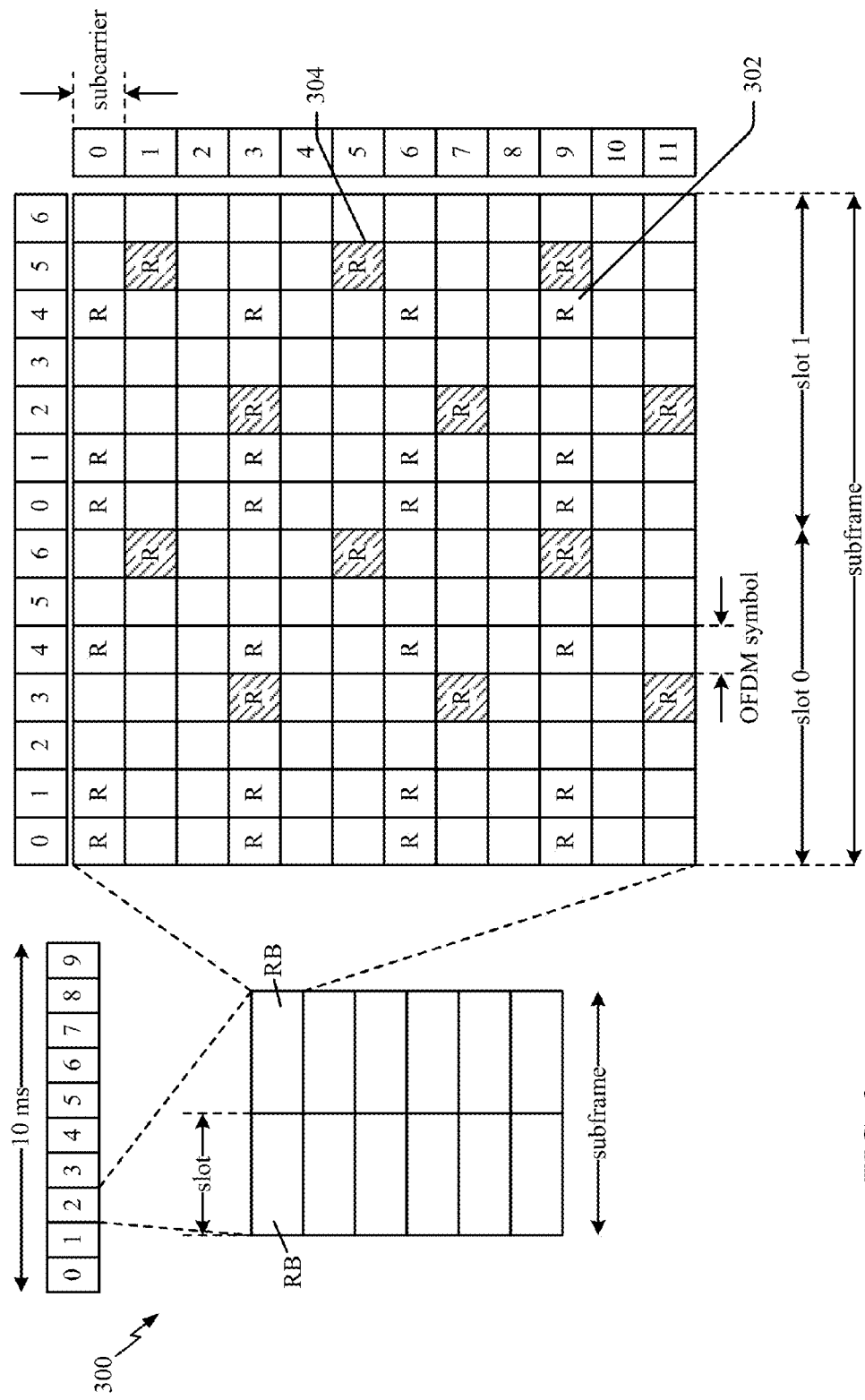
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme.

Thus, the more resource blocks that a UE receives and the higher the modulation scheme, the higher the data rate for the UE.

Figure 4:
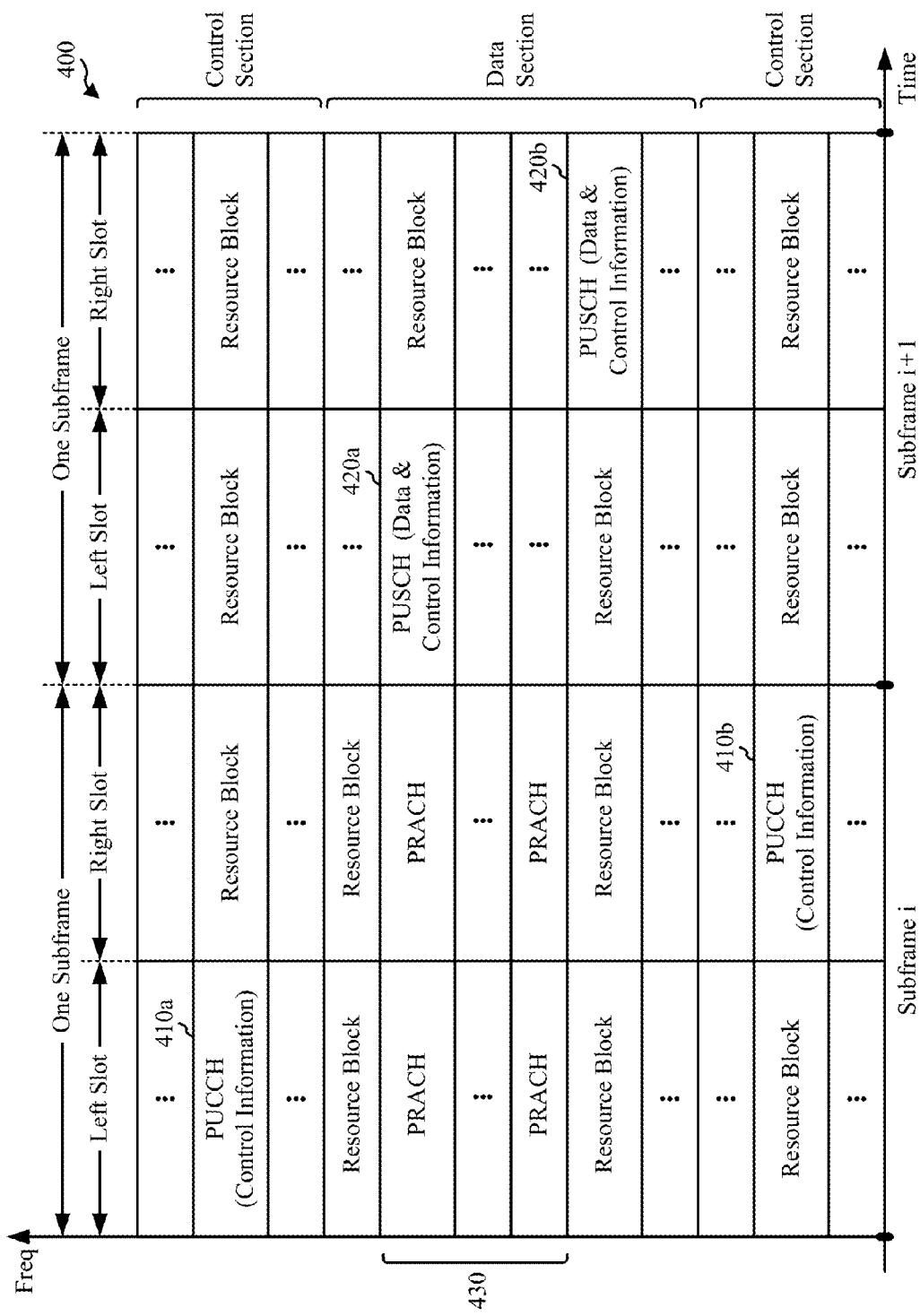
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
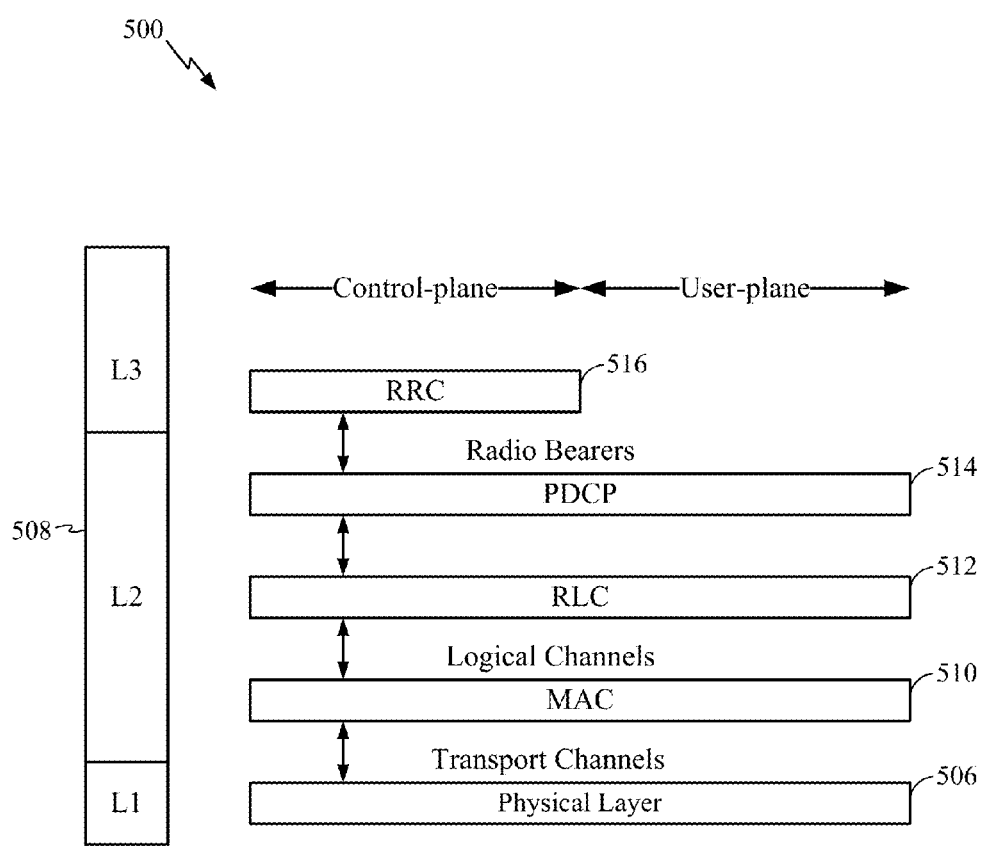
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
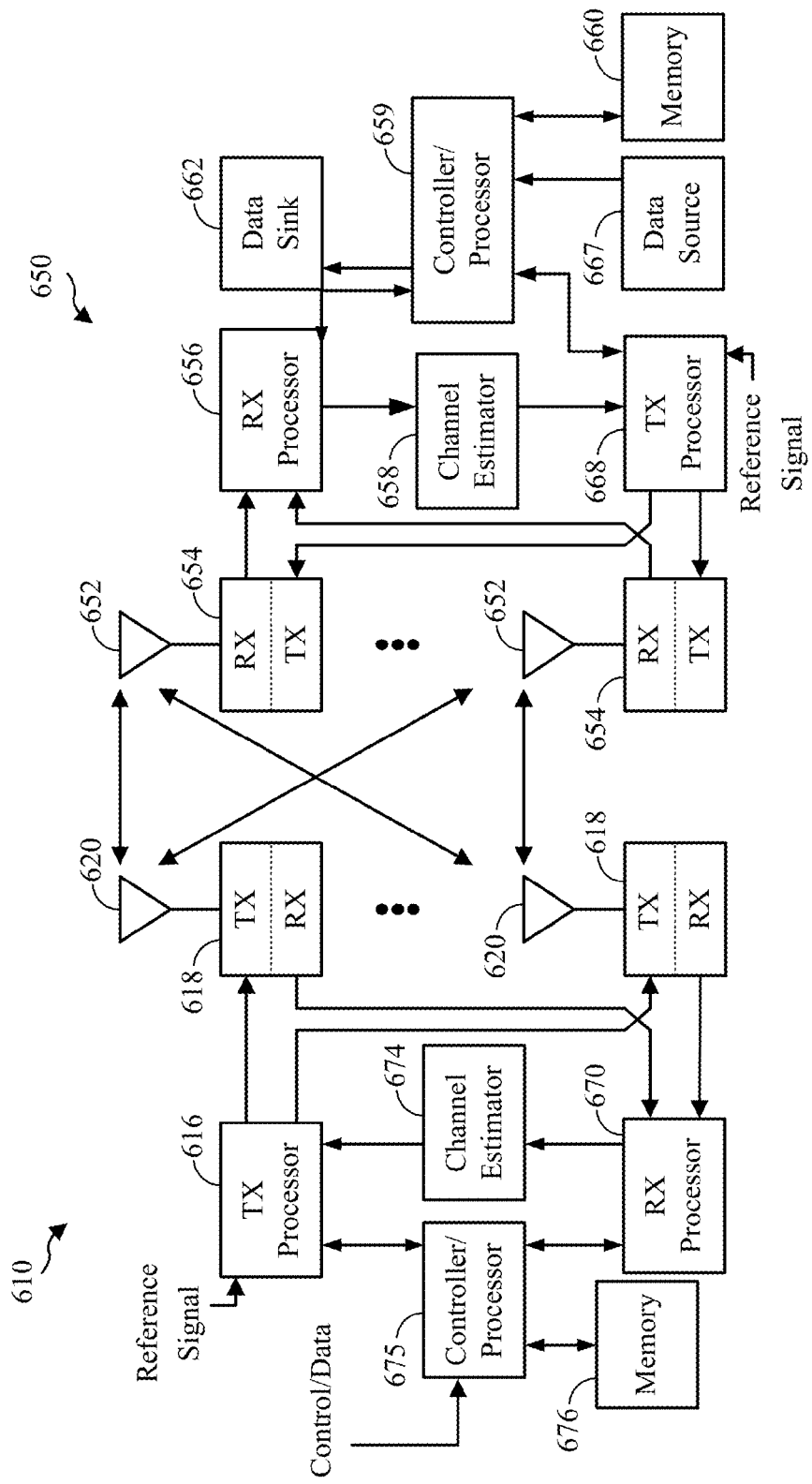
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7A:
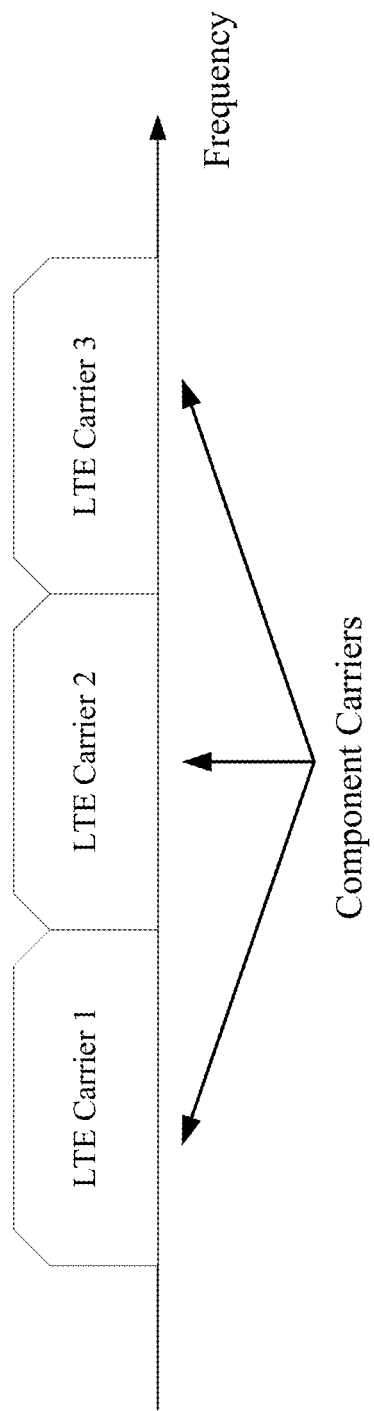
FIG. 7A discloses a continuous carrier aggregation type.
Figure 7B:
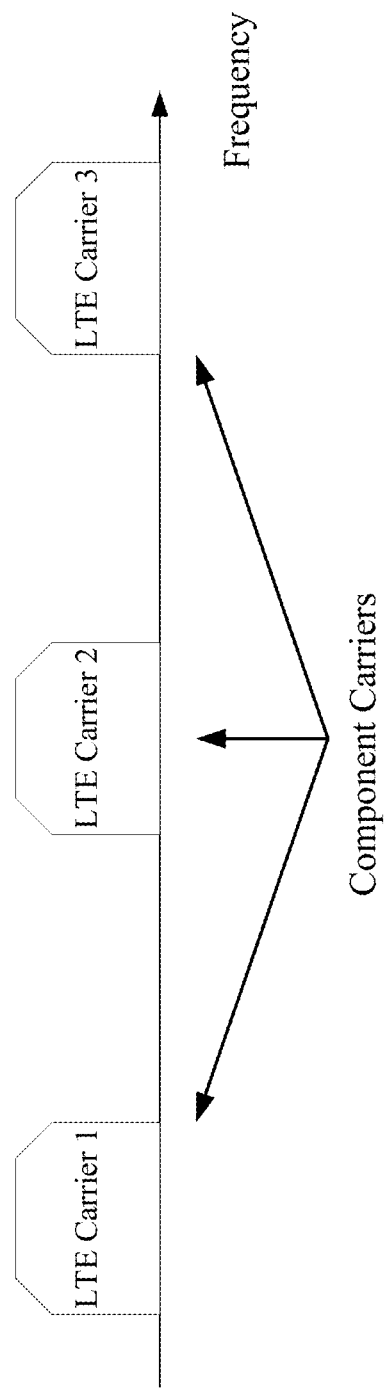
FIG. 7B discloses a non-continuous carrier aggregation type.

For the LTE-Advanced mobile systems, two types of carrier aggregation (CA) methods have been proposed, continuous CA and non-continuous CA. They are illustrated in FIGS. 7A and 7B. Non-continuous CA occurs when multiple available component carriers are separated along the frequency band (FIG. 7B). On the other hand, continuous CA occurs when multiple available component carriers are adjacent to each other (FIG. 7A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Figure 8:
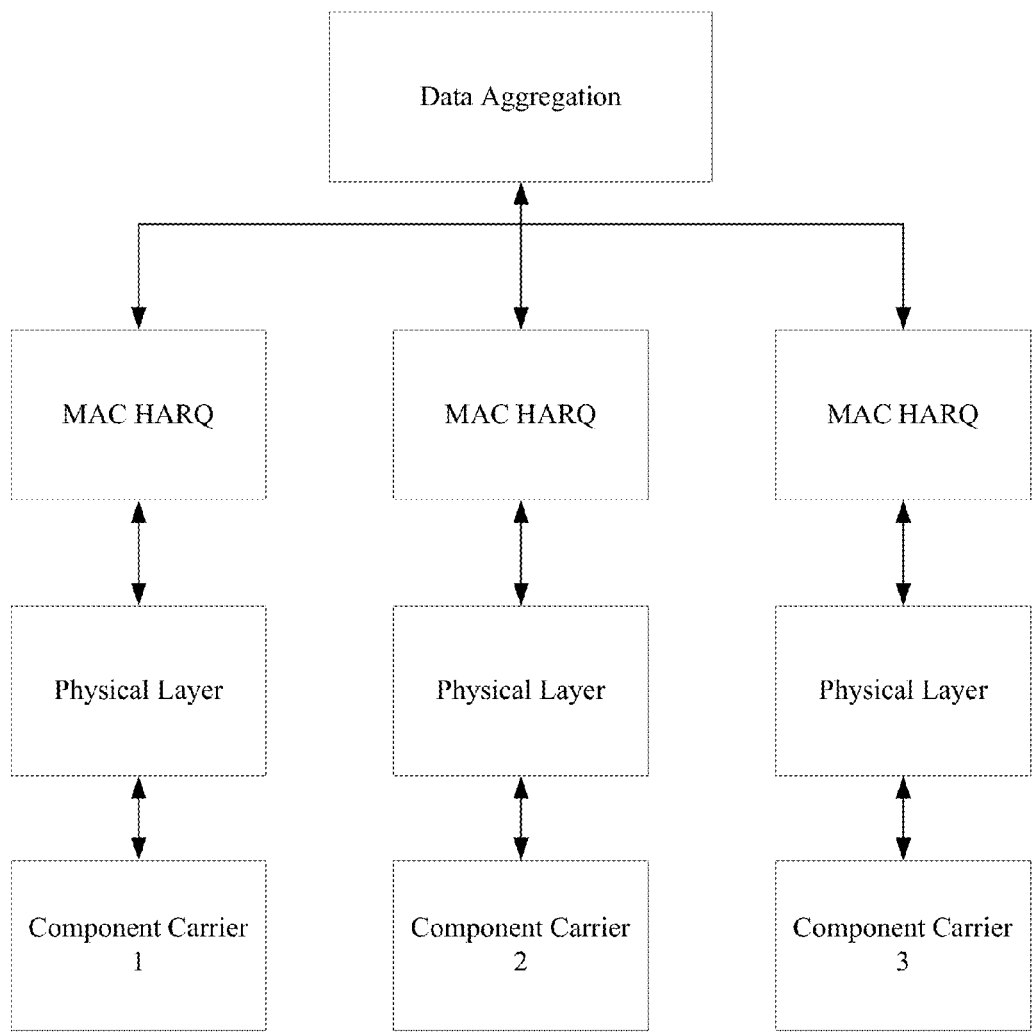
FIG. 8 discloses MAC layer data aggregation.

FIG. 8 illustrates aggregating transmission blocks (TBs) from different component carriers at the medium access control (MAC) layer for an IMT-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various examples, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNodeB.

In some examples, there may be multiple primary carriers. In addition, secondary carriers may be added or removed without affecting the basic operation of the UE, including physical channel establishment and RLF procedures which are layer 2 and layer 3 procedures, such as in the 3GPP technical specification 36.331 for the LTE RRC protocol.

Figure 9:
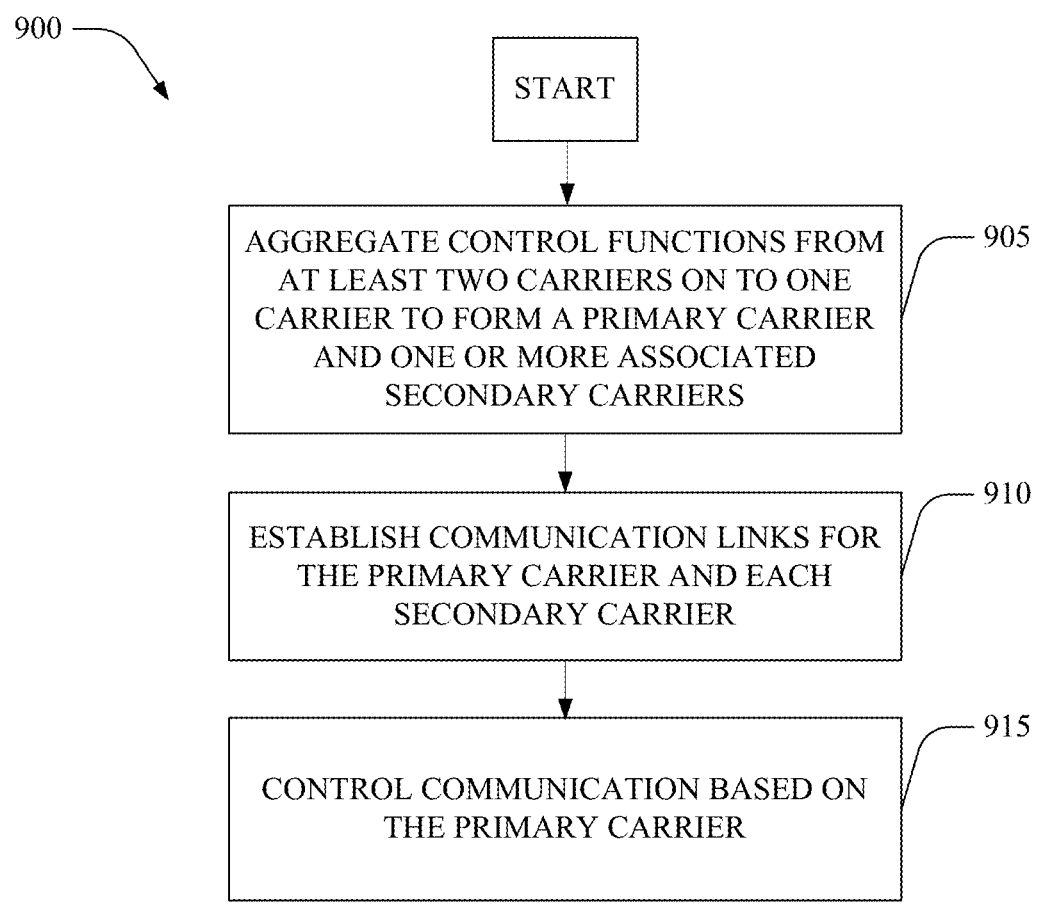
FIG. 9 is a block diagram illustrating a method for controlling radio links in multiple carrier configurations.

FIG. 9 illustrates a method 900 for controlling radio links in a multiple carrier wireless communication system by grouping physical channels according to one example. As shown, the method includes, at block 905, aggregating control functions from at least two carriers onto one carrier to form a primary carrier and one or more associated secondary carriers. Next, at block 910, communication links are established for the primary carrier and each secondary carrier. Then, communication is controlled based on the primary carrier in block 915.

As discussed above, a UE may be configured with multiple component carriers (CCs). One component carrier may be designated as primary component carrier (PCC) and the other component carriers may be designated as secondary component carriers (SCCs). The primary component carrier may be semi-statically configured via higher layers on a per UE basis. Typically, when transmitted on an uplink control channel, such as the physical uplink control channel (PUCCH), the ACK/NAK, channel quality indicator (CQI), and scheduling request (SR) are transmitted on the primary component carrier. The secondary component carriers do not transmit the uplink control channel. A five to one downlink to uplink component carrier mapping ratio is possible. That is, one UL component carrier may support ACK/NAK transmissions on an uplink control channel for up to five downlink component carriers.

In some LTE networks, such as networks that support carrier aggregation, both periodic and aperiodic channel state information (CSI) reporting may be supported. The CSI reporting may include a channel quality indicator (CQI) (wideband and/or subband), a pre-coding matrix indicator (PMI), a precoding type indicator, and/or a rank indicator (RI). Typically, reporting is for only one downlink component carrier in one subframe. The downlink component carrier is determined according to a priority. Specifically, the component carriers are prioritized based on a reporting type.

More specifically, the CQI/PMI and RI reporting types may be supported as follows: Type 1 reports support CQI feedback for the UE selected sub-bands; Type 1a reports support subband CQI and second PMI feedback; Type 2, Type 2b, and Type 2c reports support wideband CQI and PMI feedback; Type 2a reports support wideband PMI feedback; Type 3 reports support RI feedback; Type 4 reports support wideband CQI; Type 5 reports support RI and wideband PMI feedback; and Type 6 reports support RI and PTI feedback. Reporting types 3, 5, 6, and 2a are given the highest priority. Reporting types 2, 2b, 2c, and 4 are given a priority below the highest priority. Finally, reporting types 1 and 1a are given the lowest priority. In some cases, when the reporting mode/type is the same for different downlink component carriers, the downlink component carriers are prioritized based on a radio resource control-configured priority between the downlink component carriers.

The aforementioned priority rules may apply regardless of whether an uplink shared channel, such as the physical uplink shared channel (PUSCH), is present. After selecting the downlink component carrier based on the aforementioned priority, the reporting for other downlink component carriers may be discarded. Furthermore, for the selected downlink component carriers, the typical LTE Release 8 procedure for resolving collisions between a rank indicator, wideband CQI/PMI, and sub band CQI for the same component carrier may be applied.

Aperiodic CSI feedback is contemplated for a carrier aggregation system. In this case, two bits are defined in the uplink grants (e.g., aperiodic CSI request field) for the UE specific search space. Specifically, the two bits specify three different CSI reporting schemes. That is, a field of "00" indicates that CSI reporting is not specified. A field of "01" indicates that the downlink component carrier that is SIB2-linked to the uplink component carrier is used to report the CSI. A field of "10" and "11" specify that CSI reporting is configured by radio resource control (RRC) signalling.

For the common search space, one bit is provided in the uplink grants. Specifically, for the common search space, "0" indicates that CSI reporting is not triggered and "1" indicates that the CSI reporting is configured by radio resource control (RRC) signalling. The radio resource control (RRC) signalling may configure any combination of up to five component carriers.

For ACK/NAK feedback using a format 3 uplink control channel, up to ten bits may be specified for ACK/NAK for FDD in a carrier aggregation system. Specifically, the number of bits may depend on the transmission mode configured for each component carriers (K_MIMO) and the number of component carriers (N). For example, the number of ACK/NAK bits specified for FDD may be ten when a MIMO configuration is specified for each component carrier (e.g., K_MIMO equals two) and when five component carriers are specified. That is, the number of ACK/NAK bits is the product of the number of component carriers (N) and the transmission mode configured for each component carrier.

For TDD, the number of ACK/NAK bits is a product of the transmission mode configured for each component carrier (K_MIMO), the number of component carriers (N), and the maximum number of downlink subframes associated with an uplink subframe for ACK/NAK feedback (M). For example, when a MIMO configuration is specified for each component carrier (e.g., K_MIMO equals two), two component carriers are specified, and the TDD downlink/uplink subframe configuration is five so that M equals nine, thirty six ACK/NAK bits would be used (e.g., thirty six is the product of two (K_MIMO), two (N), and nine (M)).

PUCCH format 3 may be configured for a UE to transmit ACK/NAK feedback. For FDD, PUCCH format 3 is configured when two or more component carriers are configured. For TDD, PUCCH format 3 is configured when one or more component carriers are specified.

For TDD, spatial bundling is applied when the number of ACK/NAK bits exceeds twenty. For example, spatial bundling is not configured when a MIMO configuration is specified for each component carrier (e.g., K_MIMO equals two), one component carrier is specified, and the TDD downlink/uplink subframe configuration is five so that M equals nine. That is, in the present example (based on the value K_MIMO (two), the number of component carriers (one), and the number of downlink subframes associated with an uplink subframe for ACK/NAK feedback (nine)) the size of the ACK/NAK payload is eighteen bits. Thus, in the present example, spatial bundling is not specified when ACK/NAK is transmitted on PUCCH format 3 because the size of the ACK/NAK payload is less than twenty bits.

In another example, the size of the ACK/NAK payload may be thirty six bits, and therefore, spatial bundling will be specified for the ACK/NAK payload. Specifically, in the present example, a MIMO configuration is used for each component carrier (e.g., K_MIMO equals two), two component carriers are specified, and a TDD downlink/uplink subframe configuration of five is used so that M is nine. That is, in the present example, based on the value K_MIMO (two), the number of component carriers (two), and the number of DL subframes associated with the uplink subframe for ACK/NAK feedback (nine), the size of the ACK/NAK payload is thirty six bits. In this example, spatial bundling is applied for each subframe in each component carrier because the size of the ACK/NAK payload is greater than twenty bits. In the present example, when spatial bundling is applied, eighteen bits are allocated for each subframe when ACK/NAK is transmitted with PUCCH format 3.

For periodic CSI, one component carrier is reported at a specific time. Thus, CSI may be dropped due to collisions between different component carriers. The collisions may result in an extended reporting periodicity or delay. In some cases, periodic CSI may be dropped when a simultaneous uplink control channel and uplink shared channel (e.g., data channel) is not configured and there is also a collision between a multi-component carrier ACK/NAK and periodic CSI on an uplink control channel. The periodic CSI may be dropped even when simultaneous ACK/NAK and CQI is permitted. Additionally, the periodic CSI may be dropped regardless of whether the UE is configured with PUCCH format 3. In LTE Release 8, when both periodic CSI and ACK/NAK are due for transmission and there is no uplink shared channel transmission, periodic CSI and ACK/NAK are transmitted on PUCCH using format 2a/2b if simultaneous ACK/NAK and CQI is configured. Otherwise, periodic CSI is be dropped.

Excessive dropping of the periodic CSI can impact downlink scheduling and consequently downlink throughput. Although aperiodic CSI may be specified to retrieve channel information for multi-component carriers in one report, aperiodic CSI incurs control channel overhead.

According to the present disclosure, PUCCH format 3, or a modified version, may be specified to support multi-component carrier periodic CSI feedback multiplexed with ACK/NAK. Using PUCCH format 3 to support multiplexed multi-component carrier periodic CSI feedback and ACK/NAK reduces dropping of periodic CSI. PUCCH format 3 also may improve resource granularity, and follow a typical uplink control channel design. Still, there may be a limited capacity for periodic CSI feedback and ACK/NAK bits. Specifically, a typical payload size for PUCCH format 3 is limited to twenty one bits. However, if periodic CSI is allowed to be multiplexed with ACK/NAK feedback, then the PUCCH format 3 capacity may be larger, such as, for example, 22 bits.

In another aspect, a shared uplink channel, such as the PUSCH, may be specified to support multi-component carrier periodic CSI feedback and ACK/NAK multiplexing. Using the shared uplink channel to support multi-component carrier periodic CSI feedback and ACK/NAK multiplexing increases capacity. Still, using the shared uplink channel may reduce resource granularity and increase overhead.

As discussed above, in a typical LTE network an uplink control channel, such as a physical uplink control channel (PUCCH), may transmit channel state information, and ACK/NAK information, as well as a one bit scheduling request. In some cases, PUCCH format 3 may be specified to transmit the periodic CSI, ACK/NAK, and scheduling request (SR). However, in some cases, the payload size for this information (within a time division duplexing (TDD) system) may exceed a capacity limit of format 3.

In one configuration, the payload size for PUCCH format 3 is increased from twenty one bits to twenty two bits when periodic CSI is permitted to be multiplexed with ACK/NAK feedback. That is, the PUCCH format 3 may include up to ten ACK/NAK bits, up to eleven periodic CSI bits, and one scheduling request bit. Still, for TDD systems, the number of ACK/NAK bits may exceed ten bits, even when only a single component carriers is specified.

Typically, spatial bundling for ACK/NAK is based on a fixed threshold (e.g., twenty bits) and does not consider periodic CSI. The ACK/NAK bits are spatially bundled when the number of ACK/NAK bits exceeds the fixed threshold value. Still, if spatial bundling for ACK/NAK is specified (e.g., applying spatial bundling when exceeding the twenty bit threshold), the periodic CSI, the ACK/NAK, and the scheduling request (multiplexed together) may not fit within the bits allocated by PUCCH format 3 for many TDD uplink/downlink configurations.

Thus, one aspect of the present disclosure is directed to bundling the ACK/NAK, the periodic CSI, and the scheduling request. In one configuration, the decision to perform the bundling may be based on the configuration of the periodic CSI, the presence of the periodic CSI, whether periodic CSI and ACK/NAK are allowed to be multiplexed, and/or a payload size of the periodic CSI. That is, if periodic CSI is configured for a UE, then ACK/NAK bundling may be performed for all uplink subframes using a fixed threshold. The fixed threshold may be based on the capacity allocated by PUCCH format 3, the one bit scheduling request payload, and the assumed maximum periodic CSI payload. Specifically, the fixed threshold is the difference between the capacity assigned by PUCCH format 3, the one bit scheduling request payload, and the assumed maximum periodic CSI payload.

For example, the fixed threshold for ACK/NAK bundling is ten bits when the capacity of the PUCCH format 3 is twenty two bits, the maximum periodic CSI payload size is eleven bits, and the SR payload is one bit. That is, in the present example, the fixed threshold is the difference between the capacity of the PUCCH format 3 (twenty two bits), the maximum periodic CSI payload size (eleven bits), and the scheduling request payload (one bit). Accordingly, in one configuration, the ACK/NAK bits are bundled when the number of ACK/NAK bits exceeds the fixed threshold value.

In another example, the fixed threshold for ACK/NAK bundling is nine bits when the capacity of the PUCCH format 3 is twenty one bits (because periodic CSI is not permitted to be multiplexed with ACK/NAK), the maximum periodic CSI payload size is eleven bits, and the SR payload is one bit. That is, in the present example, the fixed threshold is the difference between the capacity of the PUCCH format 3 (twenty one bits), the maximum periodic CSI payload size (eleven bits), and the scheduling request payload (one bit). Accordingly, in one configuration, the ACK/NAK bits are bundled when the number of ACK/NAK bits exceeds the fixed threshold value.

In some cases, the fixed threshold may be unnecessarily low for all uplink subframes. Specifically, in some cases, periodic CSI feedback is not transmitted. Therefore, the ACK/NAK bits may be unnecessarily bundled in subframes that do not include periodic CSI feedback. T Thus, in another configuration, the ACK/NAK bundling threshold may be subframe dependent. That is, for subframes that do not include periodic CSI feedback, the threshold may be a fixed value, such as twenty bits. Additionally, for subframes that include periodic CSI feedback, the threshold may be based on either an assumed maximum periodic CSI payload value or the actual periodic CSI payload value.

As previously discussed, in one configuration, the threshold may be based on the assumed maximum payload size of periodic CSI. Specifically, in one configuration the assumed maximum payload size of periodic CSI is eleven bits. Thus, based on a twenty two bit size for PUCCH format 3, when the maximum periodic CSI payload is used for calculating the threshold, ten bits may be allocated as the threshold value for all periodic CSI subframes. Of course, the assumed maximum payload size of periodic CSI of eleven bits is an example and other maximum payload sizes for the periodic CSI may be assumed based on various criteria.

The threshold can be subframe dependent and determined based on the actual payload size of the periodic CSI. That is, the threshold for ACK/NAK bundling is the difference between the capacity of the PUCCH format 3, the scheduling request payload (one bit), and the actual periodic CSI payload size. In the present configuration, the capacity of the PUCCH format 3 is twenty two bits when periodic CSI is allowed to be multiplexed with ACK/NAK feedback. Still, these aspects of the present disclosure contemplate other sizes for the PUCCH format 3.

Based on the present configuration, in one example, if the capacity of PUCCH format 3 is twenty two bits, the SR payload is one bit, and the actual periodic CSI payload size is three bits (e.g., carrying rank information only), the threshold for ACK/NAK bundling is seventeen bits (e.g., the difference between the capacity of the PUCCH format 3 (twenty two bits), the SR payload (one bit), and the actual periodic CSI payload size (three bits)). According to the present example, spatial bundling is performed when the size of the ACK/NAK payload is greater than seventeen bits.

In another example, if the capacity of PUCCH format 3 is twenty one bits (multiplexing of periodic CSI and ACK/NAK is not permitted), the SR payload is one bit, and the actual periodic CSI payload size is three bits (e.g., carrying rank information only), the threshold for ACK/NAK bundling is sixteen bits (e.g., the difference between the capacity of the PUCCH format 3 (twenty one bits), the SR payload (one bit), and the actual periodic CSI payload size (three bits)). According to the present example, spatial bundling is performed when the size of the ACK/NAK payload is greater than sixteen bits.

In yet another example, the threshold for bundling is ten bits if the allocated capacity in PUCCH format 3 is twenty two bits, the scheduling request payload is one bit, and the actual periodic CSI payload size is eleven bits. That is, the threshold is the difference between the capacity of the PUCCH format 3 (twenty two bits), the SR payload (one bit), and the actual periodic CSI payload size (eleven bits)). According to the present example, spatial bundling is performed when the size of the ACK/NAK payload is greater than ten bits.

According to the present configuration, spatial bundling may be applied to the ACK/NAK payload when the ACK/NAK payload is greater than the determined threshold. Moreover, in the present configuration, the periodic CSI payload may be discarded from the PUCCH format 3 payload if the size of the ACK/NAK payload is still greater than the determined threshold after the spatial bundling has been applied.

Furthermore, in another configuration, spatial bundling may be performed when the ACK/NAK payload is greater than the determined threshold and a bundling parameter is activated via a higher layer. For example, the bundling parameter may be a parameter that specifies whether simultaneous ACK/NAK and CQI bundling is enabled. Specifically, based on the present example, the spatial bundling may be enabled when the ACK/NAK payload is greater than the determined threshold and the bundling parameter is set to true.

In another configuration, spatial bundling is always applied. Specifically, when periodic CSI is present in a subframe, spatial bundling is performed for ACK/NACK bits that are set for transmission in that subframe. That is, the spatial bundling may be performed regardless of the periodic CSI payload size, ACK/NAK payload size, or the scheduling request payload.

Other types of bundling in addition to, or instead of spatial bundling may also be considered. For example, subframe bundling, time-domain bundling, or component carrier bundling may be specified in addition to, or instead of spatial bundling. The bundling may be applied to all subframes and/or component carriers.

In yet another configuration, the spatial bundling may be applied to a subset of subframes or component carriers. In this example, two component carriers are specified with each component carrier configured with MIMO. Furthermore, three downlink subframes are associated with one uplink subframe for ACK/NAK feedback. Thus, in this example, twelve ACK/NAK bits are used (2×3×2). That is, the ACK/NAK bits are calculated based on a product of the number of component carriers, the number of MIMO layers, and the number of subframes. More specifically, in the present example, the ACK/NAK bits are calculated based on two component carriers, three subframes, and two MIMO layers.

Additionally, in the present example, if the bundling threshold is ten bits, spatial bundling may be performed for all subframes and both component carriers. After performing the spatial bundling, the ACK/NAK size is six bits. That is, the ACK/NAK size is the product of the number of component carriers (two), the number of subframes (three), and the number of MIMO layers (one). Specifically, because spatial bundling is performed across all component carriers, the number of MIMO layers is now one instead of two.

Alternatively, in another configuration, the bundling may be performed for only one carrier, such as the secondary component carrier (SCC). Based on the previous example, when spatial bundling is performed, the size of the ACK/NAK bundle is nine bits. Specifically, the size of the ACK/NAK bundle is calculated based on a sum of a product of the number of component carriers (two) and the number of subframes (three) for the primary carrier when no spatial bundling is performed and a product of the number of component carriers (one) and the number of subframes (three) for the secondary component carrier where spatial bundling is performed. In one configuration, if bundling occurs for only a subset of component carriers, the secondary component carriers will be bundled before the primary component carrier.

Figure 10:
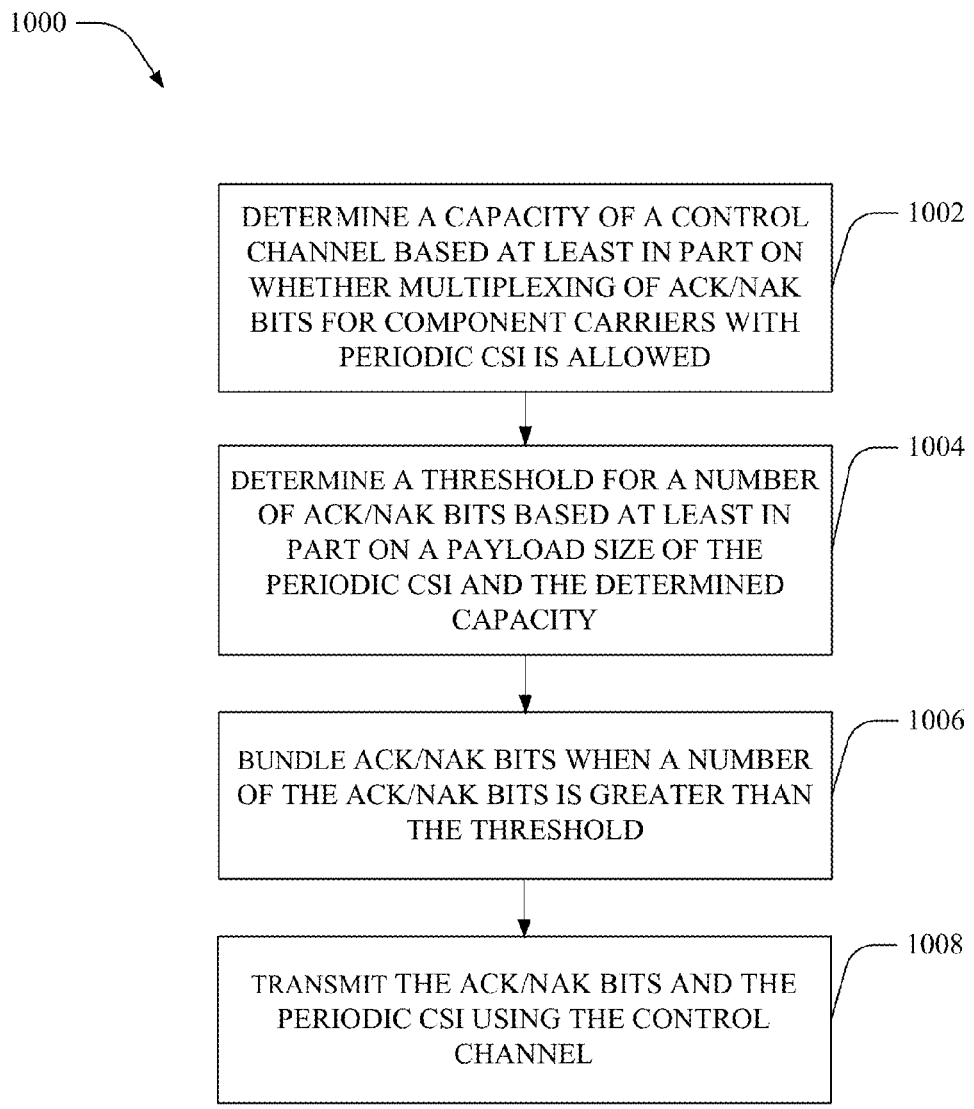
FIG. 10 is a block diagram illustrating a method for bundling in LTE.

FIG. 10 illustrates a method 1000 for bundling an ACK/NAK payload according to an aspect of the present disclosure. In block 1002, a UE determines a capacity of a control channel based at least in part on whether multiplexing of ACK/NAK bits for multiple component carriers with periodic CSI is allowed. For example, the UE may determine the capacity of PUCCH format 3. Additionally, the UE determines a threshold for a number of ACK/NAK bits based at least in part on a payload size of the periodic CSI and the determined capacity, in block 1004. The determined threshold may vary, as previously discussed.

Furthermore, the UE bundles ACK/NAK bits when a number of the ACK/NAK bits is greater than the determined threshold, in block 1006. In some aspects, the bundling may include spatial bundling, time domain bundling, or component carrier bundling. In still other aspects, the bundling may be performed across a subset of subframes or a subset of component carriers. Finally, in block 1008, the UE transmits the ACK/NAK bits and the periodic CSI using the control channel.

In one configuration, the UE 650 is configured for wireless communication including means for determining and means for bundling. In one configuration, the bundling and determining means may be the controller/processor 659, and/or memory 660 configured to perform the functions recited by the bundling means and the determining means. The UE may also include a means for transmitting. In one configuration, the transmitting means may include the controller/processor 659, memory 660, transmit processor 668, antennas 652, and or modulators 654. In another configuration, the aforementioned means may be any module or any apparatus configured to perform the functions recited by the aforementioned means.

Figure 11:
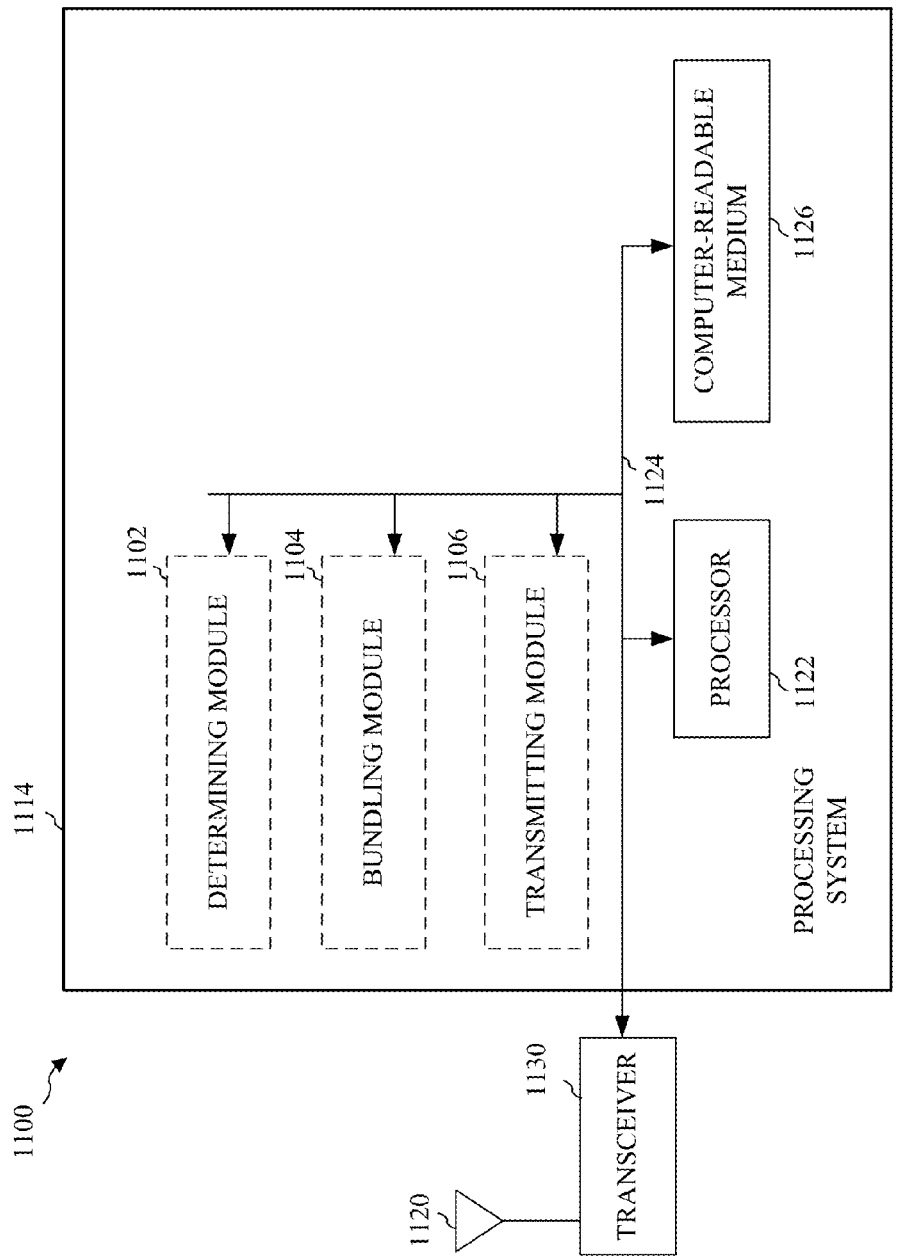
FIG. 11 is a conceptual data flow diagram illustrating the data flow between different modules/means/components in an exemplary apparatus.

FIG. 11 is a diagram illustrating an example of a hardware implementation for an apparatus 1100 employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1122 the modules 1102, 1104, 1106 and the computer-readable medium 1126. The bus 1124 may also link various other circuits such as timing sources, peripherals, voltage regulators, and power management circuits, which are well known in the art, and therefore, will not be described any further.

The apparatus includes a processing system 1114 coupled to a transceiver 1130. The transceiver 1130 is coupled to one or more antennas 1120. The transceiver 1130 enables communicating with various other apparatus over a transmission medium. The processing system 1114 includes a processor 1122 coupled to a computer-readable medium 1126. The processor 1122 is responsible for general processing, including the execution of software stored on the computer-readable medium 1126. The software, when executed by the processor 1122, causes the processing system 1114 to perform the various functions described for any particular apparatus. The computer-readable medium 1126 may also be used for storing data that is manipulated by the processor 1122 when executing software.

The processing system 1114 includes a determining module 1102 for determining a capacity of a control channel based at least in part on whether multiplexing of ACK/NAK bits for component carriers with periodic CSI is allowed. The determining module 1102 may also determine a threshold for a number of ACK/NAK bits based at least in part on a payload size of the periodic CSI and the determined capacity. The processing system 1114 also includes a bundling module 1104 for bundling ACK/NAK bits when a number of the ACK/NAK bits is greater than the determined threshold. The processing system 1114 may also include a transmitting module 1106 for transmitting the ACK/NAK bits and the periodic CSI using the control channel. The modules may be software modules running in the processor 1122, resident/stored in the computer-readable medium 1126, one or more hardware modules coupled to the processor 1122, or some combination thereof. The processing system 1114 may be a component of the UE 650 and may include the memory 660, and/or the controller/processor 659.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining a capacity of a control channel based at least in part on whether multiplexing of acknowledgement/negative acknowledgement (ACK/NAK) bits for a plurality of component carriers with periodic channel state information (CSI) is allowed, in which determining whether multiplexing ACK/NAK bits for the plurality of component carriers with the periodic CSI is allowed is based at least in part on a semi-static configuration;
   determining a threshold for a number of ACK/NAK bits based at least in part on a payload size of the periodic CSI and the determined capacity;
   bundling ACK/NAK bits when the number of ACK/NAK bits is greater than the determined threshold; and
   transmitting the ACK/NAK bits and the periodic CSI using the control channel.

2. The method of claim 1, in which the payload size comprises an actual periodic CSI payload size.

3. The method of claim 2, in which the actual periodic CSI payload size is equal to a size of a wideband channel quality indicator (CQI), a subband CQI, a precoding matrix indicator (PMI), a rank indicator (RI), or a precoding type indicator (PTI).

4. The method of claim 1, in which the periodic CSI in a subframe is for one component carrier among the plurality of component carriers.

5. The method of claim 1, in which the threshold varies across subframes.

6. The method of claim 1, in which the bundling comprises spatial bundling.

7. The method of claim 1, in which the bundling comprises at least one of time domain bundling or component carrier bundling.

8. The method of claim 1, in which the bundling comprises bundling across at least one of a subset of subframes or a subset of component carriers.

9. The method of claim 1, in which the determining the capacity comprises:
   determining a first capacity of the control channel based at least in part on whether multiplexing ACK/NAK bits for the plurality of component carriers with the periodic CSI is allowed; and
   determining a second capacity of the control channel based at least in part on whether multiplexing ACK/NAK bits for the plurality of component carriers with the periodic CSI is not allowed, the first capacity being larger than the second capacity.

10. The method of claim 1, in which the ACK/NAK bits are for a plurality of subframes in at least one component carrier among the plurality of component carriers.

11. The method of claim 1, further comprising transmitting a scheduling request (SR) via the control channel.

12. An apparatus for wireless communications, comprising:
   a memory; and
   at least one processor coupled to the memory, the at least one processor being configured:
      to determine a capacity of a control channel based at least in part on whether multiplexing of acknowledgement/negative acknowledgement (ACK/NAK) bits for a plurality of component carriers with periodic channel state information (CSI) is allowed, by:
         determining a first capacity of the control channel based at least in part on whether multiplexing ACK/NAK bits for the plurality of component carriers with the periodic CSI is allowed; and
         determining a second capacity of the control channel based at least in part on whether multiplexing ACK/NAK bits for the plurality of component carriers with the periodic CSI is not allowed, the first capacity being larger than the second capacity;
      to determine a threshold for a number of ACK/NAK bits based at least in part on a payload size of the periodic CSI and the determined capacity;
      to bundle ACK/NAK bits when the number of ACK/NAK bits is greater than the determined threshold; and
      to transmit the ACK/NAK bits and the periodic CSI using the control channel.

13. The apparatus of claim 12, in which the payload size comprises an actual periodic CSI payload size.

14. The apparatus of claim 13, in which the actual periodic CSI payload size is equal to a size of a wideband channel quality indicator (CQI), a subband CQI, a precoding matrix indicator (PMI), a rank indicator (RI), or a precoding type indicator (PTI).

15. The apparatus of claim 12, in which the periodic CSI in a subframe is for one component carrier among the plurality of component carriers.

16. The apparatus of claim 12, in which the threshold varies across subframes.

17. The apparatus of claim 12, in which the at least one processor is further configured to bundle the ACK/NAK bits via spatial bundling.

18. The apparatus of claim 12, in which the at least one processor is further configured to bundle the ACK/NAK bits via at least one of time domain bundling or component carrier bundling.

19. The apparatus of claim 12, in which the at least one processor is further configured to bundle the ACK/NAK bits across at least one of a subset of subframes or a subset of component carriers.

20. The apparatus of claim 12, in which the at least one processor is further configured to determine whether multiplexing ACK/NAK bits for the plurality of component carriers with the periodic CSI is allowed is based at least in part on a semi-static configuration.

21. The apparatus of claim 12, in which the ACK/NAK bits are for a plurality of subframes in at least one component carrier among the plurality of component carriers.

22. The apparatus of claim 12, in which the at least one processor is further configured to transmit a scheduling request (SR) via the control channel.

23. An apparatus for wireless communications, comprising:
   means for determining a capacity of a control channel based at least in part on whether multiplexing of acknowledgement/negative acknowledgement (ACK/NAK) bits for a plurality of component carriers with periodic channel state information (CSI) is allowed, in which determining whether multiplexing ACK/NAK bits for the plurality of component carriers with the periodic CSI is allowed is based at least in part on a semi-static configuration;
   means for determining a threshold for a number of ACK/NAK bits based at least in part on a payload size of the periodic CSI and the determined capacity;
   means for bundling ACK/NAK bits when the number of ACK/NAK bits is greater than the determined threshold; and
   means for transmitting the ACK/NAK bits and the periodic CSI using the control channel.

24. A computer program product for wireless communications, the computer program product comprising:
   a non-transitory computer-readable medium having program code recorded thereon, the program code comprising:
      program code to determine a capacity of a control channel based at least in part on whether multiplexing of acknowledgement/negative acknowledgement (ACK/NAK) bits for a plurality of component carriers with periodic channel state information (CSI) is allowed, by:
         determining a first capacity of the control channel based at least in part on whether multiplexing ACK/NAK bits for the plurality of component carriers with the periodic CSI is allowed; and
         determining a second capacity of the control channel based at least in part on whether multiplexing ACK/NAK bits for the plurality of component carriers with the periodic CSI is not allowed, the first capacity being larger than the second capacity;
      program code to determine a threshold for a number of ACK/NAK bits based at least in part on a payload size of the periodic CSI and the determined capacity;
      program code to bundle ACK/NAK bits when the number of ACK/NAK bits is greater than the determined threshold; and
      program code to transmit the ACK/NAK bits and the periodic CSI using the control channel.

25. An apparatus for wireless communications, comprising:
   a memory; and
   at least one processor coupled to the memory, the at least one processor being configured:
      to determine a capacity of a control channel based at least in part on whether multiplexing of acknowledgement/negative acknowledgement (ACK/NAK) bits for a plurality of component carriers with periodic channel state information (CSI) is allowed, in which determining whether multiplexing ACK/NAK bits for the plurality of component carriers with the periodic CSI is allowed is based at least in part on a semi-static configuration;
      to determine a threshold for a number of ACK/NAK bits based at least in part on a payload size of the periodic CSI and the determined capacity;
      to bundle ACK/NAK bits when the number of ACK/NAK bits is greater than the determined threshold; and
      to transmit the ACK/NAK bits and the periodic CSI using the control channel.

* * * * *